(12) United States Patent
Shook et al.

(10) Patent No.: US 7,079,449 B2
(45) Date of Patent: Jul. 18, 2006

(54) METHODS AND SYSTEMS FOR LOW FREQUENCY SEISMIC AND INFRASOUND DETECTION OF GEO-PRESSURE TRANSITION ZONES

(75) Inventors: G. Michael Shook, Idaho Falls, ID (US); Samuel D. LeRoy, Houston, TX (US); William M. Benzing, Tulsa, OK (US)

(73) Assignee: Batelle Energy Alliance, LLC, Idaho Falls, ID (US)

( * ) Notice: Subject to any disclaimer, the term of this patent is extended or adjusted under 35 U.S.C. 154(b) by 255 days.

(21) Appl. No.: 10/368,875

(22) Filed: Feb. 18, 2003

(65) Prior Publication Data

US 2004/0184348 A1    Sep. 23, 2004

(51) Int. Cl.
*G01V 1/30* (2006.01)
*G01V 1/40* (2006.01)
(52) U.S. Cl. .............................. 367/47; 367/38; 367/57; 702/11
(58) Field of Classification Search ................. 367/38, 367/47–49, 57; 702/5, 11, 14
See application file for complete search history.

(56) References Cited

U.S. PATENT DOCUMENTS

| | | | | | |
|---|---|---|---|---|---|
| 3,292,143 | A * | 12/1966 | Russell | ........................ | 367/30 |
| 3,622,965 | A * | 11/1971 | Wu | .............................. | 367/47 |
| 3,671,930 | A * | 6/1972 | Mateker, Jr. | ................. | 367/47 |
| 3,781,784 | A * | 12/1973 | Desbrandes | ................... | 367/30 |
| 4,207,619 | A * | 6/1980 | Klaveness | .................... | 367/36 |
| 4,210,968 | A * | 7/1980 | Lindseth | ....................... | 367/46 |
| 4,449,208 | A * | 5/1984 | Moeckel et al. | .............. | 367/30 |
| 4,573,148 | A * | 2/1986 | Herkenhoff et al. | .......... | 367/47 |
| 4,694,438 | A * | 9/1987 | Sengupta | ..................... | 367/70 |
| 4,858,200 | A * | 8/1989 | Goins | .......................... | 367/75 |
| 5,130,949 | A * | 7/1992 | Kan et al. | ..................... | 367/27 |
| 5,136,552 | A * | 8/1992 | Kelly et al. | ................... | 367/47 |
| 5,191,557 | A * | 3/1993 | Rector et al. | ................. | 367/57 |
| 5,311,484 | A | 5/1994 | Anderson et al. | | |
| 5,460,223 | A * | 10/1995 | Economides | ................ | 166/249 |
| 5,586,082 | A * | 12/1996 | Anderson et al. | ............. | 367/73 |
| 5,784,334 | A * | 7/1998 | Sena et al. | ..................... | 367/47 |
| 5,798,982 | A * | 8/1998 | He et al. | ....................... | 367/73 |
| 5,808,966 | A * | 9/1998 | Calvert et al. | ................ | 367/73 |
| 6,131,071 | A * | 10/2000 | Partyka et al. | ................ | 702/16 |
| 6,473,695 | B1 * | 10/2002 | Chutov et al. | ................. | 702/2 |
| 6,631,783 | B1 * | 10/2003 | Khan | ......................... | 181/108 |
| 6,681,185 | B1 * | 1/2004 | Young et al. | ................. | 702/14 |
| 6,807,487 | B1 * | 10/2004 | Khan | .......................... | 702/16 |
| 6,941,227 | B1 * | 9/2005 | Goloshubin et al. | .......... | 702/17 |
| 2002/0159332 | A1 * | 10/2002 | Thomann et al. | ............. | 367/35 |

\* cited by examiner

*Primary Examiner*—Jack Keith
*Assistant Examiner*—Scott A. Hughes
(74) *Attorney, Agent, or Firm*—TraskBritt, P.C.

(57) ABSTRACT

Methods for determining the existence and characteristics of a gradational pressurized zone within a subterranean formation are disclosed. One embodiment involves employing an attenuation relationship between a seismic response signal and increasing wavelet wavelength, which relationship may be used to detect a gradational pressurized zone and/or determine characteristics thereof. In another embodiment, a method for analyzing data contained within a response signal for signal characteristics that may change in relation to the distance between an input signal source and the gradational pressurized zone is disclosed. In a further embodiment, the relationship between response signal wavelet frequency and comparative amplitude may be used to estimate an optimal wavelet wavelength or range of wavelengths used for data processing or input signal selection. Systems for seismic exploration and data analysis for practicing the above-mentioned method embodiments are also disclosed.

27 Claims, 6 Drawing Sheets

Gradational Pressurized Zone Thickness/Wavelet Wavelength

Ramp Thickness = 50 feet
Average Velocity = 8500 feet/sec

FIG. 5A

Ramp Thickness = 100 feet
Average Velocity = 8500 feet/sec

FIG. 5B

Ramp Thickness = 200 feet
Average Velocity = 8500 feet/sec

FIG. 5C

Ramp Thickness = 400 feet
Average Velocity = 8500 feet/sec

METHODS AND SYSTEMS FOR LOW FREQUENCY SEISMIC AND INFRASOUND DETECTION OF GEO-PRESSURE TRANSITION ZONES

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

BACKGROUND OF THE INVENTION

1. Field of the Invention

The present invention relates generally to a method for detecting gradational zones in subterranean zones. More specifically, the present invention provides methods for detecting a gradational pressure transition zone and characteristics thereof prior to drilling therein by way of reflection seismology.

2. State of the Art

In the drilling of petroleum and other deep wells, one of the difficulties is in detecting when a drilling operation may be approaching or may be entering zones of increasing pressure. Unexpected entry into such "overpressured" zones can result in well blow-out, loss of equipment, injury and loss of life, and the release of oil and other fluids into the surface environment. During drilling of a borehole with a rotary drill bit, drilling fluids, usually referred to as "muds," are circulated in the borehole to cool and lubricate the rotary drill bit, flush cuttings from the bottom of the hole, carry cuttings to the surface, and hydrostatically balance formation pressures encountered by the borehole. Mud weight is carefully monitored and may be increased during drilling operations to compensate for geopressure. In some areas, it may be necessary to install a casing within the borehole so that relatively heavy mud weights necessary to compensate for geopressure will not damage the borehole. Accordingly, attempts have been made to identify such overpressured zones by way of seismic analysis.

Seismic identification of formation characteristics is widely practiced by the energy industry as an exploration method in the search for hydrocarbons in the form of petroleum and natural gas. Typically, an input signal source at the ground surface is used to generate acoustic waves which radiate down through the earth, although the use of subsurface signal sources is also known. The waves may then be refracted and reflected by the stratigraphic layers in the subterranean formation. Particularly strong reflections may occur at boundaries between rock layers that have a marked difference in impedance caused by an abrupt change in velocity and density. The acoustic reflections may be detected and timed by a line of geophones on the surface, although disposition of geophones in a borehole is also practiced. In general, acoustic velocities are relatively slower in rocks with low elasticity magnitudes such as shales, but relatively faster in more rigid rocks such as sandstones or limestones. The reflections of the seismic record may therefore correspond to layers of differing rock types that may be used for stratigraphic work or the search for specific rock bodies.

There have been several attempts to predict the existence and location of overpressured subterranean zones from seismic reflection profiles. Velocity or density differences associated with the transition from normal formation pressures to overpressured zones sometimes may produce a sharp impedance boundary, causing a strong reflection. A synthetic seismogram may be generated from well logs in the vicinity of the seismic reflection profile to predict the amplitude and phase of the reflector corresponding to the top of the pressure gradient surface. Also, since Poisson's ratio differs for different pore pressures, pressure gradients may be located by analyzing seismic reflection profiles to determine the ratio of compressional velocity to shear velocity. Furthermore, compressional to shear velocity ratios (i.e., Poisson's ratio) may be produced from the use of both traditional shear seismic sources on land, or from predictive shear velocity logs based from logs of other physical properties.

Unfortunately, these methods are typically dependent on drilling a wellbore, performing logging operations to determine characteristics along the wellbore, and then analyzing the logging data to predict the existence of pressure gradients. Drilling into excessive pore pressure regions without forewarning may be dangerous and is generally undesirable. Accordingly, the prior art has attempted to predict gradational pressurized zones prior to drilling therein and without drilling a wellbore.

U.S. Pat. No. 5,311,484 to Anderson et al. describes a method of using reflection strength processing and redisplay to determine pressure gradient positions within a subterranean formation. Particularly, Anderson teaches that waveform smoothing of reflection strength traces may enhance the changes in the amplitude thereof, thus indicating geopressure.

However, a need clearly exists for a reliable technique of sensing the location of a gradational pressurized zone, or an acoustic gradient. Furthermore, a need also exists for a more reliable technique for locating deposits of natural gas and petroleum based on seismic analysis. Moreover, a need is evident for seismic-while-drilling measurement and prediction of gradational pressurized zones to prevent inadvertent drilling thereinto and subsequent possible blow out.

BRIEF SUMMARY OF THE INVENTION

The present invention comprises methods for seismic exploration and for detecting a gradational pressurized zone within a subterranean formation. More particularly, the method of the present invention may be used to indicate the position and thickness of a gradational pressurized zone within a subterranean formation. Thus, a seismic response signal may be analyzed in order to indicate a gradational pressurized zone. The methods of the present invention may be suited for relatively low frequency data analysis and input signals. "Gradational pressurized zone," as used herein, refers to any gradational surface or region (having a pressure gradient) including subterranean zones containing oil and/or gases, hydrates, and shallow water flow.

Typically, reflection seismology may be used to determine the geological structure of a subterranean formation. An acoustic energy source may be placed at the surface of or within a subterranean formation to transmit an acoustic signal into the formation. Geological interfaces between differing materials, stress states, and pressures may exhibit various responses to the input acoustic signal, which may be measured and recorded for processing. Many techniques for processing the response data exist, including noise removal, summing, normalizing, removal of multiple reflections, and stacking, as well as other techniques. Also, wavelets may be used to reshape the non-ideal wavelet trace produced by the acoustic source. Two commonly used wavelets are zero-phase and minimum-phase wavelets. Subsequent to wavelet reshaping, the wavelet-processed signal may be bandpass filtered about a desired frequency, as known in the art. As such, frequency of a wavelet, as used herein, refers to a wavelet-processed signal that is bandpass filtered about the frequency. Similarly, since frequency and wavelength are mathematically related, the wavelength of a wavelet, as used herein, refers to a wavelet-processed signal that is bandpass filtered about a frequency that corresponds to the wavelength.

One embodiment of a method of the present invention involves employing an attenuation relationship in relation to a response signal to detect a gradational pressurized zone and/or determine characteristics thereof. Stated another way, a response signal characteristic, such as seismic amplitude, phase, reflection strength (via the envelope of the complex Hilbert Transform Trace), or acoustic impedance may be attenuated as a function of the wavelength/frequency of the wavelet of the response signal. Existence of such a relationship may be used to determine the existence of a gradational pressurized zone. More specifically, as the wavelength of the wavelet of the response signal increases, the magnitude of the response signal characteristic increases and may indicate a gradational pressurized zone. Further, the method of the present invention may be most suited to wavelet frequencies of between about 4 cycles per second or lower to about 32 cycles per second, corresponding to wavelengths of roughly between 2,000 feet to about 250 feet (depending on the velocity of the signals through a formation).

The relationship, hereinafter known as the "attenuation relationship" between the comparative amplitude of the response signal to the input signal wavelength may be of the form:

$$A_c = \left(.5 \cdot \cos\left(2 \cdot \pi \cdot \frac{T_g}{\lambda}\right)\right) + .5 \qquad \text{Equation 1}$$

Where:
$A_c$ is the comparative amplitude of the wavelet of the response signal to the wavelet of the input signal;
$T_g$ is the thickness of the gradational pressurized zone; and
$\lambda$ is the wavelength of the wavelet of the response signal.

Similarly, other comparative characteristics such as reflection strength (via the envelope of the complex Hilbert Transform Trace), phase, or acoustic impedance may exhibit similar attenuation behavior.

Therefore, in one embodiment, the present invention may be implemented by providing an input signal, measuring a response signal and analyzing the response signal in relation to the attenuation relationship. Analyzing response signals in relation to the attenuation relationship may comprise correlating the attenuation relationship to a response signal characteristic that is determined for different wavelet wavelengths. Thus, the attenuation relationship may or may not apply to the response signal, depending on the level of correlation that exists. This approach may be useful in predicting whether or not a gradational pressurized zone exists within the formation. Further, if a correlation exists between the response signal characteristic for differing wavelet wavelengths the attenuation relationship may be used to estimate the thickness of the gradational pressurized zone as well as the acoustic contrast between the gradational pressurized zone boundaries.

In another embodiment, the relationship between response signal frequency and comparative amplitude may be used to estimate an optimal wavelength or range of wavelengths used for data processing or input signal selection. Moreover, since wavelength and frequency are related mathematically, frequencies used in data processing or of a response signal may be optimized. Also, since wavelength and frequency are related mathematically, the present invention contemplates attenuation relationships that may be at least partially based on wavelet frequency. Moreover, it may be possible to configure an input signal to preferentially exhibit a frequency or range of frequencies but, generally, suitable input signals may be created by explosive charges and may therefore comprise a relatively wide range of frequencies. Thus, although it may be possible to optimize the input frequency by way of a series of time-delayed explosive charges, or otherwise, and thus maximize the comparative amplitude of the response signal, it is contemplated that the response signal may be preferably analyzed by way of an optimized frequency or wavelength determination. More specifically, data analysis of the response signal may be improved by processing the response data about an optimized frequency or wavelength or range thereof.

In a further embodiment, an attenuation relationship may be used in a seismic-while-drilling system. A response signal may be analyzed to indicate the position of an acoustic gradient in relation to the position of the drill bit. For instance, a response signal may be analyzed in relation to a first frequency or wavelength and the response signal may also be analyzed in relation to a different frequency or wavelength. By comparing a signal characteristic of the analyzed response signal in relation to a first frequency to a signal characteristic of the analyzed response signal in relation to a second frequency, the position of a gradational pressurized zone may be determined. More specifically, characteristics of the wavelets of the response signal having different frequencies/wavelengths may be compared in order to determine the relative position of a gradational pressurized zone. Additional processing may involve multiple frequencies or wavelengths as desired. Multiple response signal characteristics may be analyzed as well, and may be used to indicate the position or relative proximity of a gradational pressurized zone.

In addition, the present invention comprises a method for analyzing a response signal for signal characteristics that may change in relation to the distance between the input signal source and the gradational pressurized zone. Such a method may be particularly useful for drilling operations wherein a drilling apparatus including an acoustic source, such as a measurement while drilling (MWD) tool, is approaching a gradational pressurized zone. Further, the MWD tool may be configured in situ to process seismic data and indicate the relative position or a selected proximity of the tool in relation to the gradational pressurized zone.

In one embodiment, an input signal having at least one frequency or wavelength is transmitted into the formation from a first location whether it be on the surface or downhole. Thus, a response signal may be produced and measured from the input signal generated at a first location. A second input signal may be transmitted into the formation from a second location, the second location being closer to the gradational pressurized zone. Thus, a response signal may be produced and measured from the second input signal and analyzed in relation to the response signal of the first input signal. More specifically, a signal characteristic of the first response signal may be compared to a signal characteristic of the second response signal in order to determine a relative proximity of the second location to the gradational pressurized zone.

As such, a downhole drilling tool capable of generating acoustic signals may be employed in combination with hydrophones, as known in the art, or other measurement devices located on the surface of the subterranean formation in order to compare a second response signal characteristic with a first response signal characteristic. Moreover, the downhole tool may include hydrophones or other measurement devices as known in the art. Thus, determination of the relative proximity of a drilling tool to a gradational pressurized zone may be accomplished. Additionally, the downhole tool may be configured to prevent further drilling upon reaching a selected proximity to a gradational pressurized zone, or may send a signal to the surface to indicate the relative proximity of a drilling tool to a gradational pressurized zone.

Features from any of the above mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
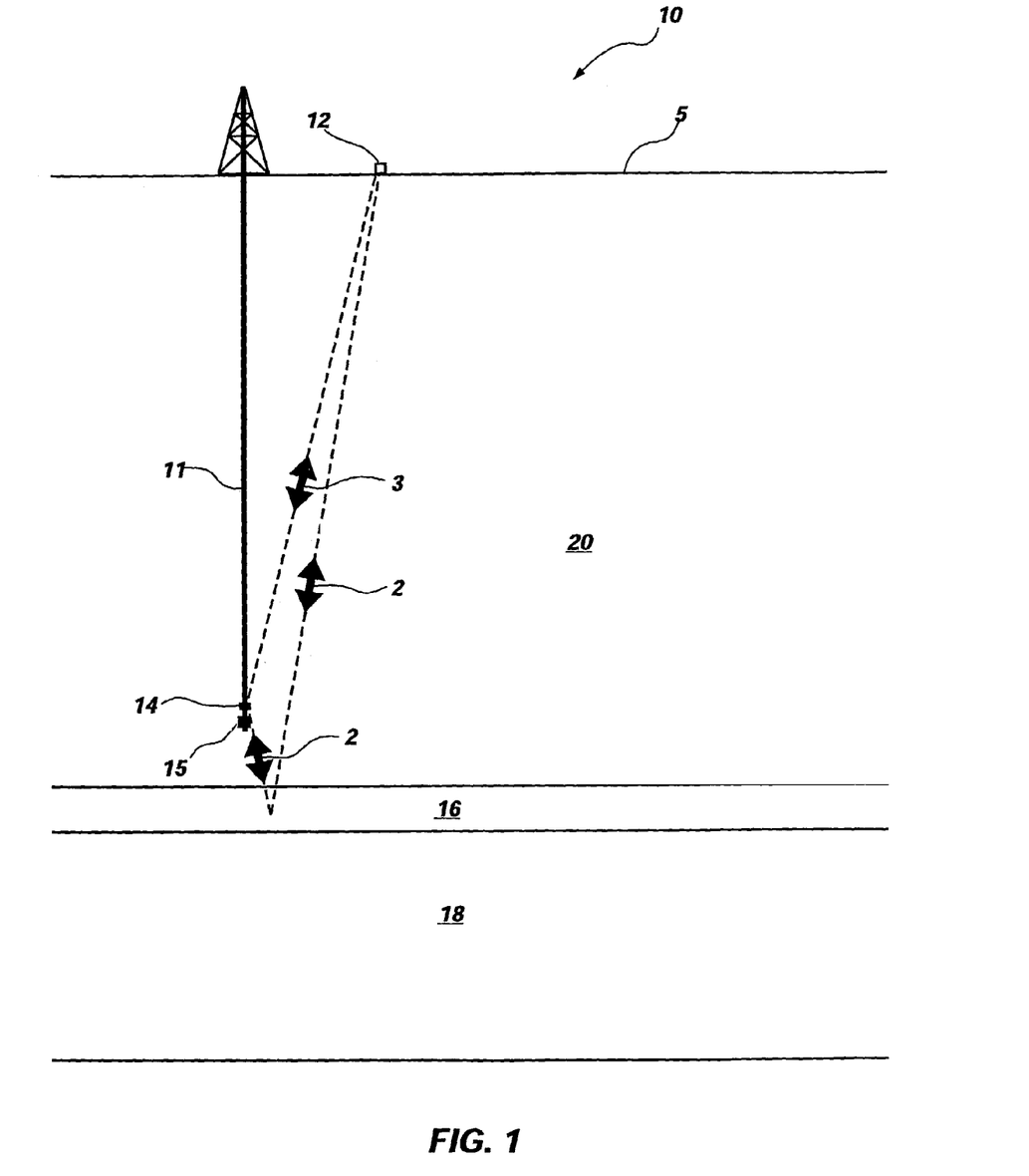
FIG. 1 is a schematic view of a seismic system of the present invention.

FIG. 1 shows a schematic view of a seismic system 10 of the present invention. Rotary drill bit 15 is attached to the end of drill string 11 distal to the surface 5. Downhole tool 14 may be attached to drill string 11 above rotary drill bit 15 and may be configured as an acoustic source and/or a receiver. Similarly, surface seismic component 12 may be configured as an acoustic source and/or a receiver. As rotary drill bit 15 proceeds through formation 20, signals 2 travel between respective sources 14 and/or 12 and receivers 12 and/or 14. Direct signal 3 travels between sources 14 and/or 12 and receivers 12 and/or 14 along the shortest acoustical path between sources 14 and/or 12 and receivers 12 and/or 14. Gradational pressurized zone 16 separates or "seals" formation 20 and geopressure 18. Signal 2 may reflect from gradational pressurized zone 16 and may be measured by receiver(s) 12 and/or 14 to determine the comparative amplitude of the response signal 2 to the input signal 2. Thus, a seismic system 10 of the present invention may employ seismic measurement while drilling apparatus, surface seismic apparatus, or a combination therof to detect and determine properties of a gradational pressurized zone.

Figure 2:
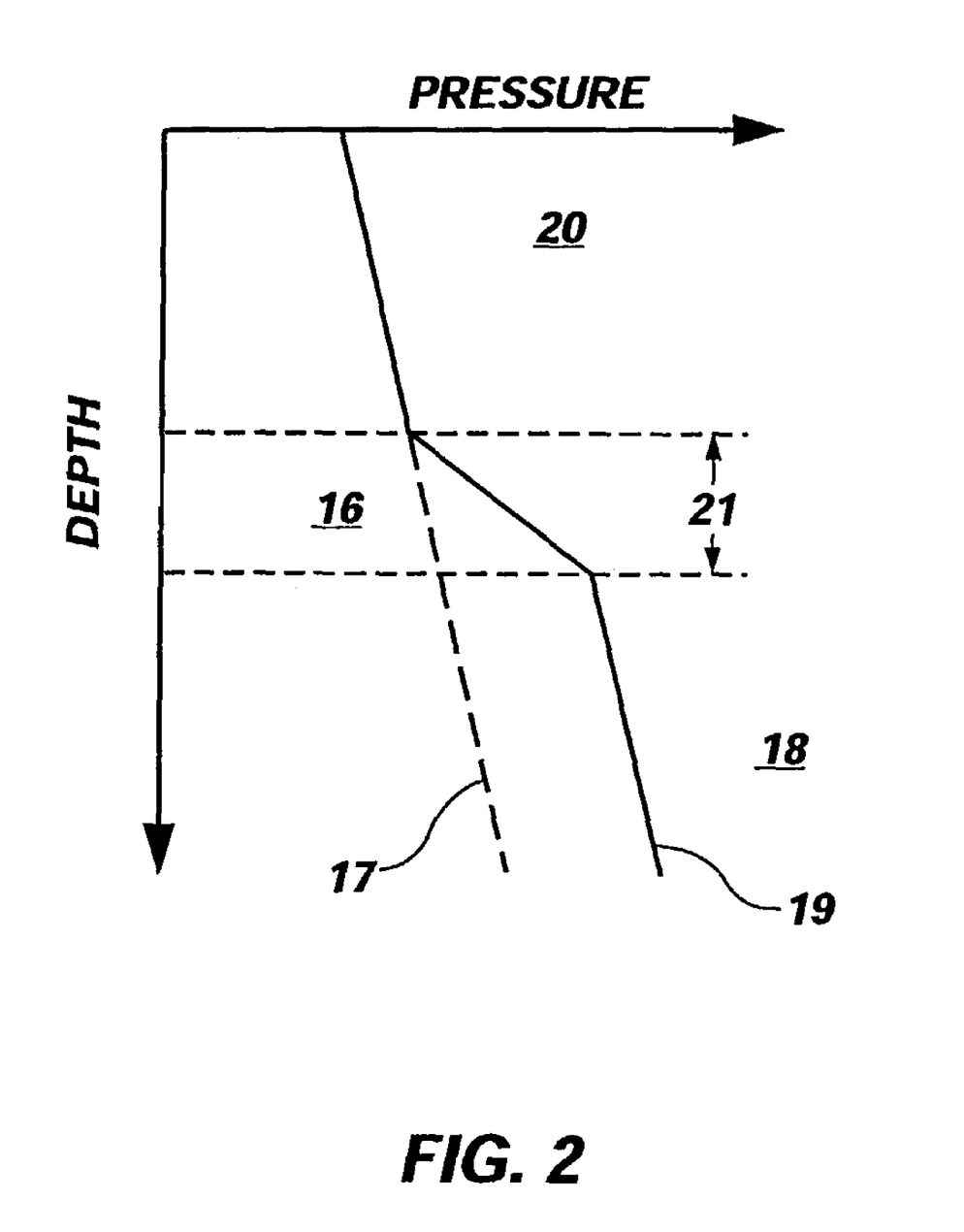
FIG. 2 is a schematic side cross-sectional view of a pressure/depth relationship of the gradational pressurized zone shown in FIG. 1.

FIG. 2 shows a side cross-sectional view of a pressure/depth relationship in the gradational pressurized zone 16 shown in FIG. 1. Pressure trace 19 increases in magnitude with increasing depth according to typical formation pressure trace 17 such as the overburden pressure and pore pressure until pressure trace 19 enters gradational pressurized zone 16. Gradational pressurized zone 16 has a thickness 21 that separates geopressure 18 and formation 20. Within gradational pressurized zone 16, pressure trace 19 gradually increases over the typical pressure/depth relationship shown by pressure trace 17. Within geopressure 18, the pressure trace 19 may assume a slope substantially equal to the slope of formation pressure trace 17 as a function of increasing depth. Thus, gradational pressurized zone 16 provides a gradational seal between formation 20 and geopressure 18. Although pressure trace 19 is shown as increasing linearly with increasing depth, other alternatives are contemplated such as parabolic, polynomial, exponential, or other non-linear gradational increases in pressure trace 19 within gradational pressurized zone 16 and also geopressure 18.

Figure 3A:
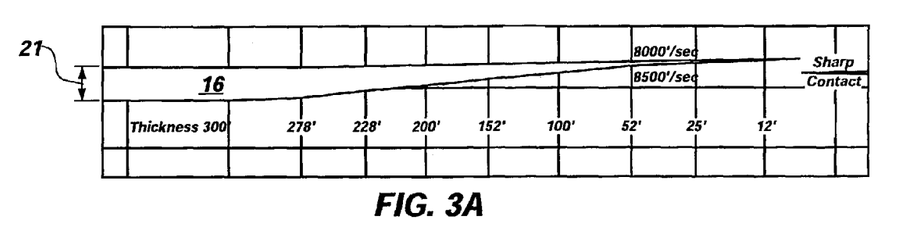
FIG. 3A–3E illustrate response signal wavelets of four different frequencies corresponding to a gradational pressurized zone of varying thickness.

FIG. 3B–3E show Ricker wavelets generated from seismic data having frequencies of 4 cycles per second (Hertz), 8 Hertz, 16 Hertz, and 32 Hertz, respectively corresponding to the formation configuration as shown above FIGS. 3B–3E in FIG. 3A. Stated another way, FIGS. 3B–3E show four synthetic seismograms having frequencies of 4 Hertz, 8 Hertz, 16 Hertz, and 32 Hertz corresponding to a formation section as shown in FIG. 3A. As may be seen in FIG. 3A, the gradational pressurized zone 16 thickness 21 decreases from about 300 feet on the far left to a sharp discontinuity contact on the far right of the depicted formation section.

Figure 3B:
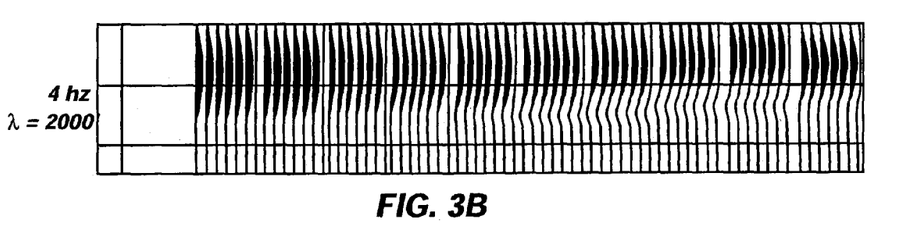

Moving to the 4 Hertz seismogram shown in FIG. 3B and corresponding to about a 2000 foot wavelength, the wavelet trace shows slight attenuation as a function of gradational pressurized zone thickness 21. Thus, the wavelet trace indicates the gradational pressurized zone 16 along its varying thickness and including the sharp discontinuous contact. Also, the wavelet trace amplitude may slightly decrease as a function of increasing gradational pressurized zone 16 thickness 21.

Figure 3C:
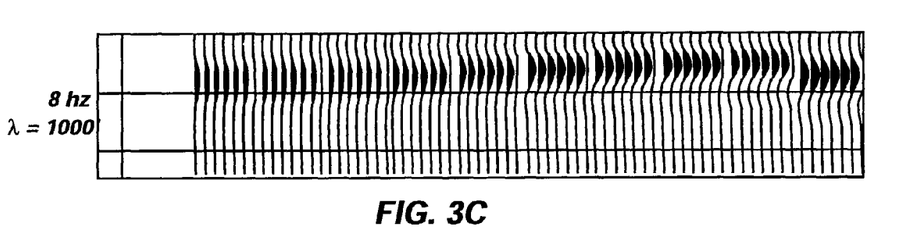

Similarly, the 8 Hertz seismogram shown in FIG. 3C and corresponding to about a 1000 foot wavelength includes moderate attenuation as a function of gradational pressurized zone thickness 21, but the wavelets are visible within the entire gradational pressurized zone 16 along the horizontal extent shown in FIG. 3A. However, the variation of amplitude in the wavelet trace in FIG. 3C is more apparent in comparison to the seismogram shown in FIG. 3B. In FIG. 3C, as the thickness 21 of the gradational pressurized zone 16 increases, the amplitude of the wavelet trace decreases.

Figure 3D:
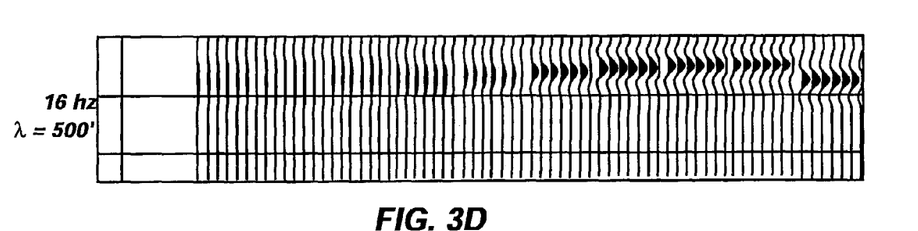

The 16 Hertz seismogram, shown in FIG. 3D and corresponding to about a 500 foot wavelength, shows considerable attenuation as a function of gradational pressurized zone thickness 21 for gradational pressurized zone thicknesses 21 of greater than about 200 feet. For gradational pressurized zone thicknesses 21 of greater than about 200 feet, the wavelets become less discernible as viewed on the seismogram. Since the 16 Hertz wavelet trace corresponds to a wavelength of about 500 feet, it may be seen from the seismogram that when the wavelet wavelength is greater than about 2.5 times larger than the thickness of the gradational pressurized zone 16, a wavelet is apparent on the seismogram. Thus, the 16 Hertz seismogram shows considerable attenuation of the amplitude of the response signal when the wavelet wavelength is less than about 2.5 times the thickness 21 of the gradational pressurized zone 16. Further, as the thicknesses 21 of gradational pressurized zone 16 decreases from about 200 feet, the amplitude of the wavelet trace increases.

Figure 3E:
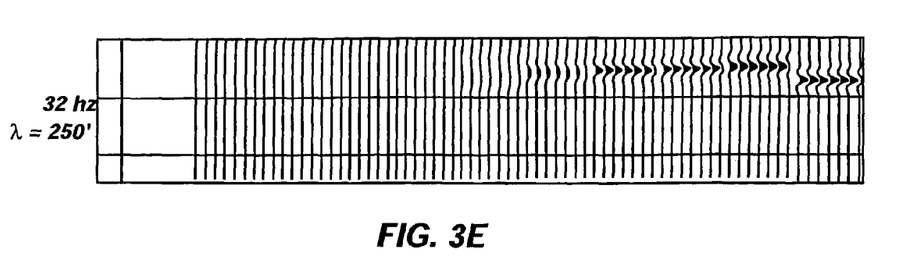

Similarly, the 32 Hertz seismogram, shown in FIG. 3E and corresponding to a wavelength of about 250 feet, shows considerable attenuation as a function of gradational pressurized zone thickness 21 when the thickness 21 of the gradational pressurized zone 16 is greater than about 100 feet. Specifically, the 32 Hertz seismogram corresponds to a wavelet wavelength of about 250 feet, so that for gradational pressurized zone thicknesses 21 of greater than about 100 feet, the 32 Hertz seismogram may not indicate, when taken alone, the gradational pressurized zone 16. However, for gradational pressurized zone 16 thicknesses 21 of less than about 100, the amplitude of the wavelet trace increases as a function of decreasing gradational pressurized zone 16 thickness 21.

Although wavelets having higher relative frequencies or lower relative wavelengths may indicate to a lesser degree, when taken alone, the presence of a gradational pressurized zone, use of higher frequencies or lower wavelengths is included in aspects of the present invention. Further, although a particular wavelet trace of a particular frequency or wavelength as illustrated herein may not appear to be discernible or indicative of a gradational pressurized zone alone, the relation of a wavelet having minimally observable characteristics compared to a wavelet having observable characteristics may indicate the presence and possibly aid in estimating the properties of a gradational pressurized zone. Thus, the present invention encompasses comparison of the relative changes in characteristics of a response signal. In addition, the present invention may also encompass comparison of an observable characteristic of a response signal with the a minimally observable characteristic of a response signal.

However, it may be desirable to detect the frequency/wavelength at which the characteristic of a response signal becomes minimally observable, so that at least two points of an attenuation relationship may be known. Stated another way, if the response signal is attenuated, it is desirable to compare a non-attenuated response signal characteristic with an attenuated response characteristic only if the relationship between the two characteristics may be determined. Therefore, since considerable attenuation of the amplitude of the response signal when the wavelet wavelength is less than about 2.5 times the thickness of the gradational pressurized zone, it may be preferable to transmit an input signal including a wavelength of greater than about 2 times the thickness of a gradational pressurized zone encountered by the input signal, so that the wavelengths near or within the transition from attenuation to non-attenuation may be observed.

Also, as may be seen from FIGS. 3A–3E, the present invention contemplates that it may be preferable to compare a wavelet having a wavelength of less than 250 feet with a wavelet having a wavelength of more than 250 feet for determining the existence of and/or a characteristic of a gradational pressurized zone. Similarly, the present invention contemplates that it may be preferable to compare a wavelet having a wavelength of less than 2000 feet with a wavelet having a wavelength of more than 2000 feet for determining the existence of and/or characteristic of a gradational pressurized zone. Moreover, it may be advantageous to analyze a response signal by generating a wavelet having a wavelength greater than about 2 times the thickness of the gradational pressurized zone so that wavelengths near or within the transition from attenuation to non-attenuation may be observed.

Depending on the thickness of the gradational pressurized zone it may be preferable to compare a number of different wavelet wavelengths for determining the existence and/or a characteristic of a gradational pressurized zone. For instance, it may be advantageous to compare a wavelet having a wavelength of about 250 feet to a wavelet having a wavelength of about 500 feet. Alternatively, it may be advantageous to compare a wavelet having a wavelength of about 500 feet to a wavelet having a wavelength of about 1000 feet. In addition, it may be advantageous to compare a wavelet having a wavelength of about 1000 feet to a wavelet having a wavelength of about 2000 feet. Also, as may be seen from FIGS. 3A–3E, it may be advantageous, for example, to compare a wavelet having a first wavelength with a second wavelet having a wavelength of about 2 times the wavelength of the first wavelength.

Figure 4:
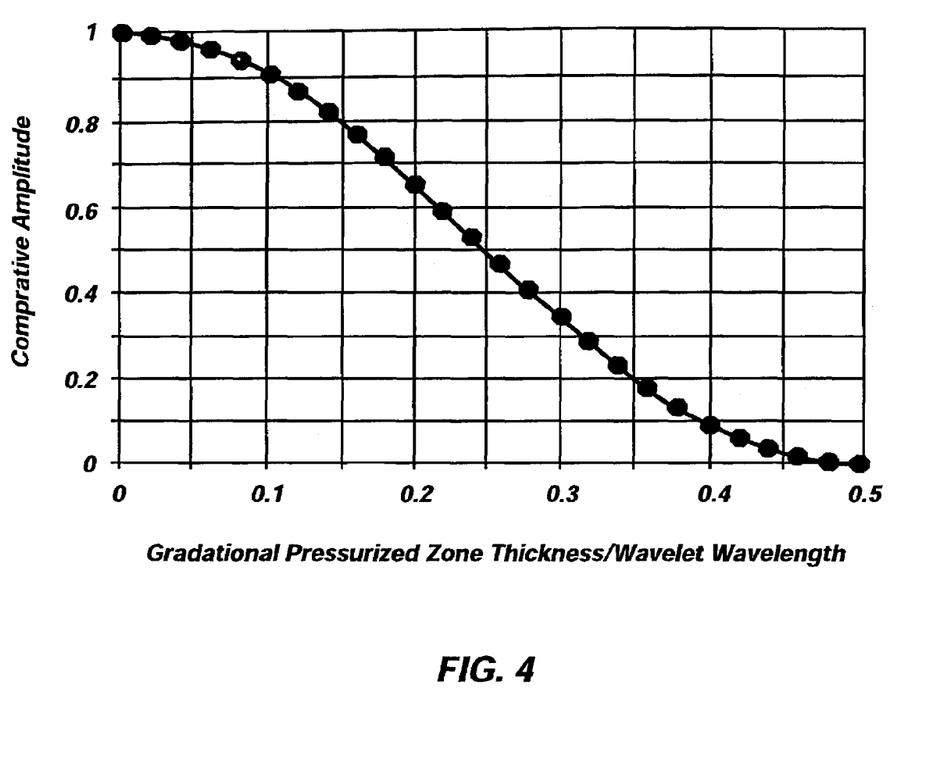
FIG. 4 is a graph showing the relationship between the comparative amplitude of a wavelet of a response signal to a wavelet of an input signal as a function of the transition zone thickness divided by the wavelet wavelength of the response signal.

FIG. 4 illustrates the attenuation relationship of Equation 1. More specifically, FIG. 4 shows a graph depicting the relationship between the comparative amplitude of a response signal to an input signal as a function of transition zone thickness and wavelength of the response signal wavelet. FIG. 4 may summarize the data shown in FIG. 3 in that, when the wavelength of the input signal is much larger than the gradational pressurized zone thickness, the comparative amplitude is relatively high. As an example, if the response signal wavelet wavelength is 10 times as large as the gradational pressurized zone thickness, making the ratio of gradational pressurized zone thickness to the response signal wavelet wavelength about 0.1, then the comparative amplitude of a response signal wavelet to an input signal wavelet is about 0.9 or 90%. Therefore, generally, the larger the response signal wavelet wavelength is in relation to the gradational pressurized zone thickness, the greater the comparative amplitude. Furthermore, since frequency is proportional to the wavelength, it may be seen from FIG. 3 and FIG. 4 that lower response signal wavelet frequencies may be desirable for seismic data analysis, at least in comparison with another response signal wavelet frequency, for indicating relatively thick gradational pressurized zones.

For example, the attenuation relationship may be correlated by comparing a relatively low frequency (high wavelength) response signal wavelet and a comparatively higher frequency (low wavelength) response signal wavelet that is almost, or even completely, attenuated. Thus Equation 1 may be written for both wavelet wavelengths, with the gradational pressurized zone thickness as the unknown in both equations. If the gradational pressurized zone thickness solutions for both equations is nearly the same, or converges, the attenuation relationship is correlated to the wavelet data. Lack of a convergent solution for gradational pressurized zone thickness to the two attenuation equations may indicate that there is little correlation between the attenuation relationship and the observed data, or, in other words, that a gradational pressurized zone does not exist. Of course, additional data points may be needed in order to improve confidence and accuracy of the correlation.

In addition, other signal characteristics besides comparative amplitude may exhibit similar attenuation relationships. For instance, other comparative characteristics such as reflection strength (via the envelope of the complex Hilbert Transform Trace), phase, or acoustic impedance may exhibit similar frequency attenuation behavior. Thus, the methods of the present invention may be employed by measuring a response signal characteristic that exhibits attenuation behavior.

Moreover, an input signal may be transmitted into the formation from the surface or from a downhole tool. A characteristic of the response signal in relation to the differing frequencies and wavelengths may be measured and analyzed to determine whether an attenuation relationship applies. If an attenuation relationship exists, the response data may be used to predict properties of the gradational pressurized zone, such as the thickness and location of the gradational pressurized zone. An attenuation relationship may be derived empirically, by extrapolation, or otherwise derived prior to or during drilling operations.

Turning back to FIG. 1, one embodiment of the present invention may include a surface acoustic source and receiver 12 configured to determine the existence of a gradational pressurized zone prior to drilling a borehole with rotary drill bit 15, downhole tool 14, and drill string 11. Further, downhole tool 14 may be configured as an acoustic source, and the position of the rotary drill bit 15 in relation to the gradational pressurized zone 16 may be determined by measurement of signals 2 and direct signal 3. Alternatively, the downhole tool 14 may be configured as an acoustic source and receiver and may also process response signal measurements to indicate relative position of the rotary drill bit 15 in relation to the gradational pressurized zone 16. Such an arrangement provides the advantage that raw response signal data need not be transmitted back to the surface for processing. Further, the downhole tool may be configured to send a signal to the surface, e.g., a detectable mud pulse through the drilling fluid, to the surface to indicate that a relative position between the rotary drill bit 15 and the gradational pressurized zone 16 has occurred.

FIGS. 5A–5D illustrate graphically the relationship between comparative amplitude of a response signal and wavelet frequency for different gradational pressurized zone thicknesses. Specifically, FIGS. 5A, 5B, 5C, and 5D show the comparative amplitude of a response signal to an input signal as a function of the wavelet frequency for gradational pressurized zone thicknesses of 50 feet, 100 feet, 200 feet, and 400 feet, respectively. As may be seen from the graphs, for each gradational pressurized zone thickness, there is an optimal wavelet frequency or frequency range for maximizing the comparative amplitude of the response signal. For instance, in FIG. 5A the optimal wavelet frequency is about 15 cycles per second, in FIG. 5B the optimal wavelet frequency is about 10 cycles per second, in FIG. 5C the optimal wavelet frequency is about 6 cycles per second, and in FIG. 5D the optimal wavelet frequency is about 3 cycles per second. The implication of these relationships may be two-fold. On one hand, if the input signal may be configured to preferentially contain the optimal frequency or a range of frequencies near the optimal frequency, the response signal of that frequency or those frequencies may be stronger, or have a higher signal to noise ratio. On the other hand, if the input signal is not configurable, then the response signal may be analyzed with respect to the optimal frequency by way of selective filtering, e.g., bandpass filtering, to accentuate indications of a gradational pressurized zone. It is further contemplated by the present invention that a mathematical relationship may be determined in terms of comparative amplitude as a function of wavelet frequency and gradational pressurized zone thickness and may be used in any of the methods disclosed herein.

Furthermore, seismic data is often filtered via deconvolution and spectral whitening or zero-phase deconvolution to remove undesirable multiples of the reflection data, and may be used to enhance certain aspects in the response data. As such, it may be desirable to employ an optimal frequency as shown in FIGS. 5A–5D in a deconvolution operation, so that those frequencies that produce the highest comparative amplitudes are accentuated in the seismic data. Thus, an optimal frequency or range of frequencies may be used to process the seismic reflection data to enhance the detection of a gradational pressurized zone.

Figure 5A:
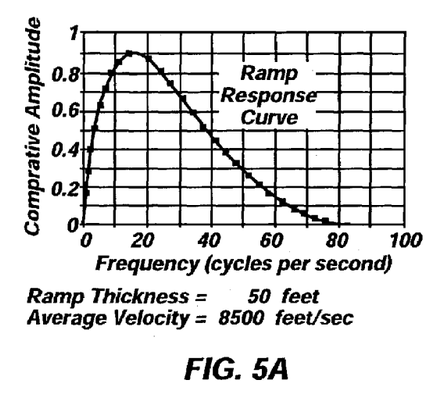
FIG. 5A–5D each show a graph of the relationship between the comparative amplitude of wavelets of a response signal to wavelets of an input signal as a function of wavelet frequency for different gradational pressurized zone thicknesses.
Figure 5B:
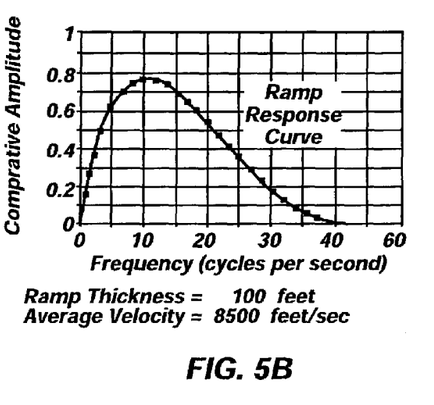
Figure 5C:
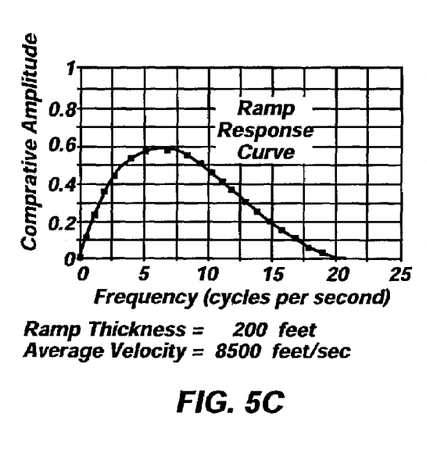
Figure 5D:
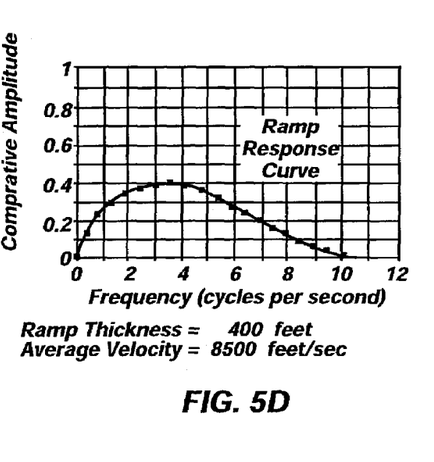

For instance, as may be seen from FIGS. 5C and 5D, it may be advantageous to choose a range of frequencies that correspond to a comparative amplitude of 0.4 or higher for a gradational pressurized zone thickness of between 200 and 400 feet. Stated in a different way, frequencies of about 3 to 4 Hertz for a gradational pressurized zone thickness of about 400 feet correspond to a comparative amplitude of about 0.4, while frequencies of about 4 Hertz to about 11 Hertz for a gradational pressurized zone thickness of about 200 feet correspond to a comparative amplitude 0.4 or higher. Therefore, frequencies that correspond to a comparative amplitude of 0.4 or higher may be chosen to optimize the comparative amplitude of a signal characteristic within seismic data for estimated or known gradational pressurized zone thickness of between 200 feet and 400 feet. Likewise, as may be seen from FIGS. 5C and 5B, frequencies that correspond to a comparative amplitude of 0.5 or higher may be chosen to optimize the comparative amplitude of a signal characteristic within seismic data for estimated or known gradational pressurized zone thickness of between 100 feet and 200 feet. Also, as may be seen from FIGS. 5B and 5A, frequencies that correspond to a comparative amplitude of 0.7 or higher may be chosen to optimize the comparative amplitude of a signal characteristic within seismic data for estimated or known gradational pressurized zone thickness of between 0 feet and 100 feet.

As an additional embodiment of the present invention, an input signal transmitted into a subterranean formation from one location and another input signal transmitted into the formation from another location may be used to identify a gradational pressurized zone and characteristics thereof. More particularly, a first input signal at a first distance from a gradational pressurized zone may be transmitted into the formation and a first response signal may be measured. Further, a second input signal at a second distance from a gradational pressurized zone may be transmitted into the formation and a second response signal may be measured. The first response signal may be compared to the second response signal in order to determine the existence of a gradational pressurized zone. More particularly, the phase of each response signal's respective wavelets may be compared to detect a gradational pressurized zone as well as characteristics thereof.

Figure 6A:
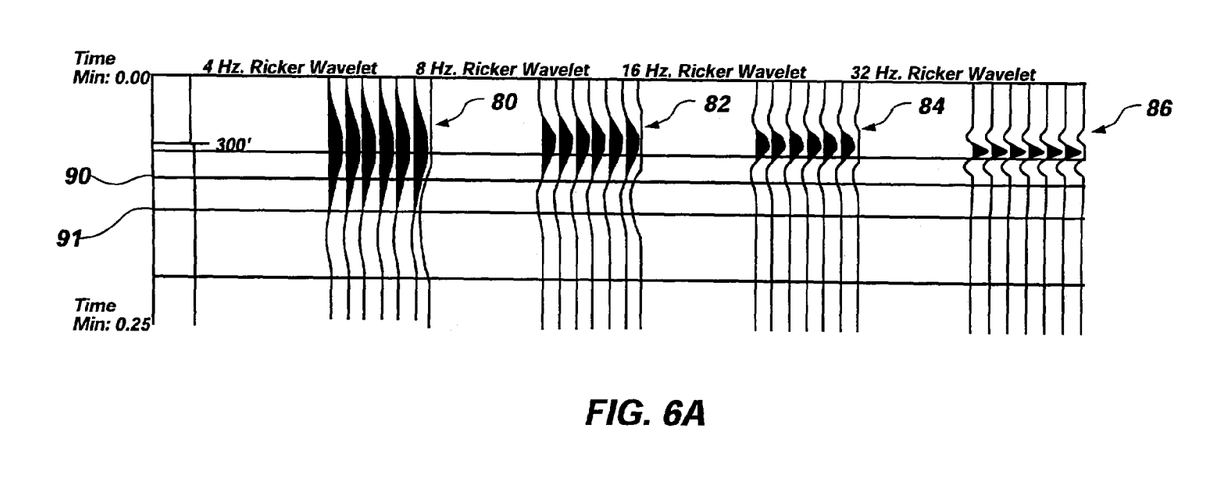
FIG. 6A shows response signal wavelets of four different frequencies generated by way of an input signal transmitted into a formation at a relatively long distance from a 300 foot thick gradational pressurized zone.
Figure 6B:
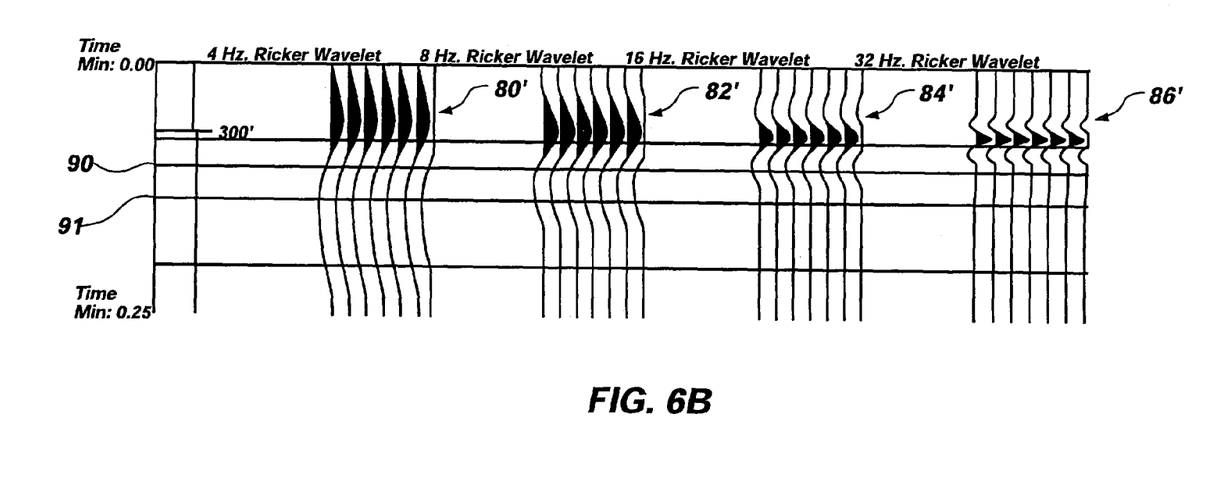
FIG. 6B shows response signal wavelets of four different frequencies generated by way of an input signal transmitted into a formation at a relatively short distance from a 300 foot thick gradational pressurized zone.

FIG. 6A shows a seismogram comprising four different groups of wavelets, 80, 82, 84, and 86, corresponding to 4 Hertz, 8 Hertz, 16 Hertz, and 32 Hertz frequencies, respectively, the data being generated for a gradational pressurized zone thickness of 300 feet wherein the acoustic source is located at a distance relatively far from the gradational pressurized zone. Similarly, FIG. 6B shows a seismogram comprising four different groups of wavelets, 80', 82', 84', and 86', corresponding to 4 Hertz, 8 Hertz, 16 Hertz, and 32 Hertz frequencies for a gradational pressurized zone thickness of 300 feet. However, in FIG. 6B, the acoustic source is located at a distance relatively near the gradational pressurized zone.

As may be seen by comparing FIG. 6A to FIG. 6B, wavelet groups 80' and 82' are shifted upward in relation to reference lines 90 and 91 as compared to the position of wavelet groups 80 and 82. Thus, as the acoustic source approaches a gradational pressurized zone, the wavelet data may be phase shifted. In addition, the phase shift may be due to wave interference between the direct and reflected waves and thus may be proportional to the distance to the gradational pressurized zone. Thus, a phase shift may indicate the presence and relative distance between the acoustic source and the gradational pressurized zone. The direction of phase shift may depend on the shape of the input wavelet such as 0 degree, 90 degree, or complex wavelets from raw field data as well as the composition of the reflection interface. The methods of the present invention may be used for all wavelet types as well as for different compositions of gradational transition zones. Also, phase relationships as a function of a gradational pressurized zone characteristic or characteristics may be derived empirically or theoretically. Further, other response signal attributes may be correlated to gradational pressurized zone characteristics and distance therefrom.

Input signals that are transmitted into a subterranean formation at different positions may have different properties, such as frequency composition and/or amplitude composition. The present invention contemplates that a first input signal may have first properties and that a second input signal may have second properties. Alternatively, both the first input signal and the second input signal may have substantially equivalent properties. Regardless of whether or not the input signals have substantially equivalent properties or have differing properties, phase shift of the wavelet data may be used to indicate a gradational pressurized zone or characteristics thereof.

A phase shift indication of a gradational pressurized zone may be useful when a downhole tool is configured with an acoustic source. Thus, as drilling proceeds closer to a gradational pressurized zone, the acoustic source also proceeds closer to the gradational pressurized zone, and seismic data may indicate its presence and relative distance of the drilling tool to the gradational pressurized zone by way of the phase shift in the seismogram. Further, an MWD tool may be configured with data analysis capability to determine a wavelet shift. Upon the wavelet shifting a selected amount, the MWD tool may be configured to communicate with the surface via mud pulse telemetry or as otherwise known in the art. Alternatively, receivers on the surface of the formation may be used to analyze seismic data for an indicative phase shift. Thus, phase shift may be used to correlate the position of the acoustic source, MWD, or drill bit in relation to the position of the gradational pressurized zone.

Wavelet groups 84 and 84' show relatively less phase shift than wavelet pairs 80 and 80' and 82 and 82' as respectively shown in FIGS. 6A and 6B for a gradational pressurized zone having a thickness of 300 feet. Likewise, wavelet groups 86 and 86' show little phase shift in relation to the other wavelet pairs for a gradational pressurized zone having a thickness of 300 feet. However, wavelets having higher frequencies may exhibit phase shifts similar to the phase shifts of wavelet pairs 80 and 80' and 82 and 82' when applied to gradational pressurized zones with different thicknesses. Moreover, although the higher frequency wavelets may not exhibit a phase shift, higher frequency wavelets may be useful in determining the thickness of the gradational pressurized zone via comparison with other wavelets and as outlined above in relation to Equation 1. Further, the present invention contemplates that estimating the thickness of a gradational pressurized zone may be accomplished via a mathematical relationship between the distance from a gradational pressurized zone, the gradational pressurized zone thickness, the phase shift of a response signal wavelet, and the frequency or wavelength thereof.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination with one another. The scope of the invention is, therefore, indicated and limited only by the appended claims and their legal equivalents, rather than by the foregoing description. All additions, deletions, and modifications to the invention, as disclosed herein and which fall within the meaning and scope of the claims are embraced thereby.

What is claimed is:

1. A method of performing seismic exploration to identify at least a presence of a gradational pressurized zone, comprising:

transmitting an input signal into a subterranean formation from one of a location proximate a drill bit at a distal end of a drill string and a location offset and remote from the distal end of the drill string;

receiving the input signal and a reflected signal comprising a response signal of the input signal at another of the location proximate the drill bit at the distal end of the drill string and the location offset and remote from the distal end of the drill string;

measuring the response signal; and analyzing the response signal to identify at least a presence of a gradational pressurized zone in an intended path of the drill bit using an attenuation relationship comprising a comparative amplitude of the response signal to the input signal as representative of at least a presence of a gradational pressurized zone by relation of an amplitude of the response signal indicative of at least the presence of a gradational pressurized zone to at least one wavelength of the input signal;

wherein the attenuation relationship comprises:

$$A_c = \left(.5 \cdot \cos\left(2 \cdot \pi \cdot \frac{T_g}{\lambda}\right)\right) + .5$$

where: $A_c$ is a comparative amplitude of the response signal to the input signal, $T_g$ is the thickness of the gradational pressurized zone, and $\lambda$ is the at least one wavelength of the input signal.

2. The method of claim 1, wherein transmitting an input signal comprises transmitting an input signal including a wavelength greater than about 250 feet.

3. The method of claim 1, wherein transmitting an input signal comprises transmitting an input signal including a wavelength greater than about 500 feet.

4. The method of claim 1, wherein transmitting an input signal comprises transmitting an input signal including a wavelength greater than about 2 times the thickness of a gradational pressurized zone encountered by the input signal.

5. The method of claim 1, wherein analyzing the response signal comprises comparing a wavelet having a wavelength of less than 250 feet to a wavelet having a wavelength of more than 250 feet.

6. The method of claim 1, wherein analyzing the response signal comprises comparing a wavelet having a wavelength of less than 2000 feet to a wavelet having a wavelength of more than 2000 feet.

7. The method of claim 1, wherein analyzing the response signal comprises generating a wavelet having a wavelength greater than about 2 times the thickness of a gradational pressurized zone encountered by the input signal.

8. The method of claim 1, wherein analyzing the response signal comprises comparing a first wavelet having a first wavelength to a second wavelet having a second wavelength of about 2 times the first wavelength.

9. The method of claim 8, wherein comparing a first wavelet having a first wavelength to a second wavelet having a second wavelength comprises comparing a first wavelet having a wavelength of about 250 feet to a second wavelet having a second wavelength of about 500 feet.

10. The method of claim 8, wherein comparing a first wavelet having a first wavelength to a second wavelet having a second wavelength comprises comparing a first wavelet having a wavelength of about 500 feet to a second wavelet having a second wavelength of about 1000 feet.

11. The method of claim 8, wherein comparing a first wavelet having a first wavelength to a second wavelet having a second wavelength comprises comparing a first wavelet having a wavelength of about 1000 feet to a second wavelet having a second wavelength of about 2000 feet.

12. The method of claim 1, further comprising selecting the location offset and remote from the distal end of the drill string to be a location at the surface of the earth.

13. A method of performing seismic exploration to identify a presence and estimate a thickness of at least a portion of a gradational pressurized zone, comprising:
   transmitting an input signal into a subterranean formation from one of a location proximate a drill bit at a distal end of a drill string and a location offset and remote from the distal end of the drill string;
   receiving the input signal and a reflected signal comprising a response signal of the input signal at another of the location proximate the drill bit at the distal end of the drill string and the location offset and remote from the distal end of the drill string;
   measuring the response signal;
   analyzing the response signal to identify a presence of at least a portion of a gradational pressurized zone in an intended path of the drill bit using an attenuation relationship comprising a comparative amplitude of the response signal to the input signal as representative of the presence of the at least a portion of the gradational pressurized zone by relation of an amplitude of the response signal indicative of the presence and the thickness of the gradational pressurized zone to at least one wavelength of the input signal wherein the attenuation relationship comprises:

$$A_c = \left(.5 \cdot \cos\left(2 \cdot \pi \cdot \frac{T_g}{\lambda}\right)\right) + .5$$

where: $A_c$ is a comparative amplitude of the response signal to the input signal, $T_g$ is the thickness of the gradational pressurized zone, and $\lambda$ is the wavelength of the at least one input signal, for $T_g$; and
   determining the thickness of the at least a portion of the identified gradational pressurized zone identified to be present responsive to analyzing the response signal.

14. A method of performing seismic exploration to identify at least a presence of a gradational pressurized zone, comprising:
   transmitting an input signal into a subterranean formation;
   measuring a response signal of the input signal;
   analyzing the response signal using an attenuation relationship comprising:

$$A_c = \left(.5 \cdot \cos\left(2 \cdot \pi \cdot \frac{T_g}{\lambda}\right)\right) + .5$$

where: $A_c$ is a comparative amplitude of a response signal to an input signal, $T_g$ is the thickness of the gradational pressurized zone, and $\lambda$ is a wavelength of the input signal; and
   identifying at least a presence of a gradational pressurized zone responsive to analyzing the response signal.

15. The method of claim 14, wherein transmitting an input signal comprises transmitting an input signal including a wavelength greater than about 250 feet.

16. The method of claim 14, wherein transmitting an input signal comprises transmitting an input signal including a wavelength greater than about 500 feet.

17. The method of claim 14, wherein transmitting an input signal comprises transmitting an input signal including a wavelength greater than about 2 times the thickness of a gradational pressurized zone encountered by the input signal.

18. The method of claim 14, wherein analyzing the response signal comprises comparing a wavelet having a wavelength of less than 250 feet to a wavelet having a wavelength of more than 250 feet.

19. The method of claim 14, wherein analyzing the response signal comprises comparing a wavelet having a wavelength of less than 2000 feet to a wavelet having a wavelength of more than 2000 feet.

20. The method of claim 14, wherein analyzing the response signal comprises generating a wavelet having a wavelength greater than about 2 times the thickness of a gradational pressurized zone encountered by the input signal.

21. The method of claim 14, wherein analyzing the response signal comprises comparing a first wavelet having a first wavelength to a second wavelet having a second wavelength of about 2 times the first wavelength.

22. The method of claim 21, wherein comparing a first wavelet having a first wavelength to a second wavelet having a second wavelength comprises comparing a first wavelet having a wavelength of about 250 feet to a second wavelet having a second wavelength of about 500 feet.

23. The method of claim 21, wherein comparing a first wavelet having a first wavelength to a second wavelet having a second wavelength comprises comparing a first wavelet having a wavelength of about 500 feet to a second wavelet having a second wavelength of about 1000 feet.

24. The method of claim 21, wherein comparing a first wavelet having a first wavelength to a second wavelet having a second wavelength comprises comparing a first wavelet having a wavelength of about 1000 feet to a second wavelet having a second wavelength of about 2000 feet.

25. The method of claim 14, further comprising determining at least one characteristic of the gradational pressurized zone identified to be present responsive to analyzing the response signal.

26. The method of claim 25 wherein identifying the at least one characteristic of a gradational pressurized zone identified to be present further comprises estimating the thickness of at least a portion of the gradational pressurized zone.

27. The method of claim 26, wherein estimating the thickness of at least a portion of the gradational pressurized zone comprises solving the attenuation relationship.

\* \* \* \* \*